(12) United States Patent
Deperraz

(10) Patent No.: US 9,228,671 B2
(45) Date of Patent: Jan. 5, 2016

(54) ELECTRICALLY ACTUATED VALVE WITH A SEALING BALL

(75) Inventor: Nicolas Deperraz, Bons en Chablais (FR)

(73) Assignee: Fluid Automation systems S.A., Versoix (CH)

( * ) Notice: Subject to any disclaimer, the term of this patent is extended or adjusted under 35 U.S.C. 154(b) by 283 days.

(21) Appl. No.: 13/981,049

(22) PCT Filed: Feb. 9, 2012

(86) PCT No.: PCT/EP2012/052245
§ 371 (c)(1),
(2), (4) Date: Jul. 22, 2013

(87) PCT Pub. No.: WO2012/107536
PCT Pub. Date: Aug. 16, 2012

(65) Prior Publication Data
US 2013/0299725 A1    Nov. 14, 2013

(30) Foreign Application Priority Data

Feb. 10, 2011   (FR) ...................................... 11 51072

(51) Int. Cl.
*F16K 31/00* (2006.01)
*F16K 17/36* (2006.01)
(Continued)

(52) U.S. Cl.
CPC .......... *F16K 31/004* (2013.01); *F02M 63/0026* (2013.01); *F16K 1/14* (2013.01); *F16K 15/183* (2013.01); *F16K 17/366* (2013.01); *F16K 31/02* (2013.01); *F16K 39/022* (2013.01); *Y10T 137/0491* (2015.04)

(58) Field of Classification Search
CPC ..... F16K 31/02; F16K 31/004; F16K 31/007; F16K 31/008; F16K 15/18; F16K 15/183; F16K 7/045; F16K 17/366; F16K 39/00; F16K 39/02; F16K 39/022; B05B 17/063; F02M 63/0026
USPC ...................................................... 251/129.06
See application file for complete search history.

(56) References Cited

U.S. PATENT DOCUMENTS 3,884,417 A * 5/1975 Sheffield et al. ............ 239/102.2
4,629,926 A   12/1986 Siegal
6,138,990 A * 10/2000 Drexel ........................ 251/335.2
6,142,444 A * 11/2000 Kluge ....................... 251/129.06
6,189,858 B1 * 2/2001 Miyazoe et al. ......... 251/129.06

(Continued)

FOREIGN PATENT DOCUMENTS

EP     117195 A1 *  8/1984
EP    2213919 A1    8/2010
WO 2009106233 A1    9/2009

OTHER PUBLICATIONS

Machine Translation of EP 0117195 A1.*

*Primary Examiner* — William McCalister
*Assistant Examiner* — Ian Paquette
(74) *Attorney, Agent, or Firm* — The Ollila Law Group LLC

(57) ABSTRACT

A valve (201) is provided that comprises a housing (202) including a fluid inlet (332) and a fluid outlet (204). The valve (201) also includes one or more vibrating elements (409) configured to vibrate when energized. The valve (201) further comprises an amplifying plate (410) including a fluid passage (412) and one or more pressure-balancing apertures (413) in fluid communication with the fluid inlet (332), contacting the one or more vibrating elements (409). A sealing ball (407) is positioned between the fluid inlet (332) and the fluid passage (412).

10 Claims, 5 Drawing Sheets

(51) Int. Cl.
*F16K 39/02* (2006.01)
*F02M 63/00* (2006.01)
*F16K 1/14* (2006.01)
*F16K 15/18* (2006.01)
*F16K 31/02* (2006.01)

(56) References Cited

U.S. PATENT DOCUMENTS 6,279,872 B1 * 8/2001 Neuhaus .................. 251/129.06
2011/0005604 A1 * 1/2011 Deperraz et al. .................. 137/1

* cited by examiner

ELECTRICALLY ACTUATED VALVE WITH A SEALING BALL

CROSS-REFERENCE TO RELATED APPLICATIONS

This is a National Stage entry of International Application No. PCT/GB2012/052245, with an international filing date of Feb. 9, 2012, which claims priority of France patent application no. 11/51072, filed Feb. 10, 2011, entitled "ELECTRICALLY ACTUATED VALVE WITH A SEALING BALL".

1. Technical Field

The embodiments described below relate to valves, and more particularly, but not exclusively, to an electrically actuated valve with a sealing ball.

BACKGROUND OF THE INVENTION

Fluid handling devices are becoming increasingly popular and there is an increased demand for fluid handling devices that are both portable and easy to use. Portable fluid handling devices are being used for applications such as home care, point of care testing, fuel cells, fragrance dispensers, etc. In order for a portable fluid handling device to be effective and efficient, it should be light weight, small in size, consume minimal power, and be cost effective to manufacture. In many applications, it is also important that the fluid handling device provide an accurate and consistent fluid distribution. Therefore, it is necessary to incorporate an efficient fluid valve in the fluid handling device. In many aspects, the fluid valve characterizes the device's efficiency.

One solution of a portable valve that attempts to meet the above criteria is a miniature solenoid valve. The miniature solenoid valve however, is not as effective as originally anticipated. Solenoid valves are limited in both size as well as power consumption. In order to obtain adequate performance, a solenoid valve typically consumes a substantial amount of power. The power consumption of a solenoid valve, in some circumstances, is unacceptable when using batteries as a power source.

Another solution has been the use of electrically actuated piezo valves. Some piezo valves operate using a closing arm that seals against a sealing shoulder when the piezo element is de-activated. These valves typically require a substantial amount of space to operate and may not always provide an adequate solution as they are subject to clogging when used with liquids that may dry around the orifice. However, it is also known in the art to provide a sealing ball, which seals against a sealing shoulder.

For example, international patent application publication WO/2009/106233, which is assigned on its face to the present applicant and incorporated herein by reference, discloses an electrically actuated valve with a sealing ball. The valve includes a vibrating element and an amplifying plate in contact with the vibrating element.

FIG. 1 shows a simplified cross-sectional view of a prior art valve 10 similar to the valve shown in FIG. 3 of the '233 application. The prior art valve 10 includes a housing 11, which is separated into a first portion 11a and a second portion 11b. The first portion 11a includes a fluid inlet 12 while the second portion 11b includes a fluid outlet 13. As can be appreciated, the fluid inlet 12 can be adapted to receive a pressurized fluid from a pressurized fluid supply (not shown). Further, the fluid outlet 13 can be provided to deliver fluid to a desired component (not shown). The valve 10 is therefore, designed to control the flow of the pressurized fluid from the fluid inlet 12 to the fluid outlet 13.

The prior art valve 10 is also shown with electrical contacts 14. The electrical contacts 14 are in contact with electrodes 15 to supply power to a vibrating element 16. The vibrating element 16 may comprise a piezoelectric material as explained in the '233 application. The vibrating element 16 is capable of vibrating when energized, i.e., when exposed to an electrical field or an electric potential. Piezoelectric materials are known in the art and are often used for their physical characteristics when energized by an alternating field. If an alternating electric field is applied to the piezoelectric element, the element 16 changes dimensions at a frequency of the electric field. Therefore, the vibrating element 16 converts electrical energy into mechanical energy. The valve 10 further includes an amplifying plate 17. The amplifying plate 17 can transfer and amplify vibrations produced by the vibrating element 16 to a sealing ball 18. The amplifying plate 17 also defines a fluid passage 19 through which fluid can flow. The fluid acting on the amplifying plate 17 is prevented from reaching the vibrating element 16 by two sealing members 20a, 20b.

The sealing ball 18 is sized and shaped to form a substantially fluid-tight seal with the fluid passage 19 to prevent fluid flow. As explained in the '233 application, the pressure of the fluid in the fluid chamber 21 provides the biasing force against the sealing ball 18. In order to allow fluid to flow through the valve 10, the vibrating element 16 is energized and caused to vibrate. The vibrations are transferred and possibly amplified by the amplifying plate 17. The vibrations of the amplifying plate 17 overcome the fluid pressure that forces the sealing ball 18 to seal against the fluid passage 19, thereby allowing fluid to flow between the inlet 12 and outlet 13.

While the prior art valve 10 provides suitable control for relatively low flow operations, as can be appreciated, the pressure of the fluid acts on a single side of the amplifying plate 17. More specifically, the pressure of the fluid acts on the inlet side of the amplifying plate 17 exposed to the inlet pressure chamber 21 across a diameter, D of the plate 17. The diameter D extends substantially entirely across the inlet pressure chamber 21. Consequently, the pressure of the fluid tends to dampen the vibrations of the amplifying plate 17. While the fluid damping may not be significant for some fluid pressures, as the fluid pressure increases, the power required to vibrate the amplifying plate 17 with predetermined amplitude also increases. As a result, high pressure applications may require an excessive amount of power.

The embodiments described below overcome this and other problems and an advance in the art is achieved. The embodiments provide an amplifying plate with one or more pressure balancing apertures. The apertures permit fluid at the inlet to act on both sides of at least a portion of the amplifying plate. The apertures can advantageously reduce the cross-sectional area of the amplifying plate that is exposed to pressurized fluid on a single side. With fluid acting on both sides of the amplifying plate, fluid dampening of the amplifying plate is substantially reduced.

SUMMARY OF THE INVENTION

An apparatus is provided according to an embodiment. The apparatus comprises a housing including a fluid inlet and a fluid outlet. According to an embodiment, one or more vibrating elements are provided that are configured to vibrate when energized. According to an embodiment, the apparatus further comprises an amplifying plate including a fluid passage and one or more pressure-balancing apertures in fluid communication with the fluid inlet, contacting the one or more vibrating elements. According to an embodiment, the apparatus further comprises a sealing ball positioned between the fluid inlet and the fluid passage.

A method of forming a valve including housing with a fluid inlet and a fluid outlet is provided according to an embodiment. The method comprises steps of positioning one or more vibrating elements in the valve housing and positioning an amplifying plate including a fluid passage and one or more pressure-balancing apertures in fluid communication with the fluid inlet to contact the one or more vibrating elements. The method further comprises a step of positioning a sealing ball between the fluid inlet and the fluid passage formed in the amplifying plate.

Aspects

According to an aspect, an apparatus comprises:
a housing including a fluid inlet and a fluid outlet;
one or more vibrating elements configured to vibrate when energized;
an amplifying plate including a fluid passage and one or more pressure-balancing apertures in fluid communication with the fluid inlet, contacting the one or more vibrating elements; and
a sealing ball positioned between the fluid inlet and the fluid passage.

Preferably, the apparatus further comprises a first sealing member forming a substantially fluid-tight seal between the amplifying plate and the housing.

Preferably, the apparatus further comprises a second sealing member including an inner sealing lip forming a substantially fluid-tight seal between the housing and the amplifying plate proximate the fluid passage and an outer sealing lip forming a substantially fluid-tight seal between the housing and the amplifying plate radially away from the fluid passage.

Preferably, the apparatus further comprises a sealing ball positioner coupled to the housing and limiting radial movement of the sealing ball with respect to the fluid passage.

Preferably, the apparatus further comprises an electrical circuit contacting the vibrating element and configured to energize the vibrating element.

Preferably, the pressure balancing apertures allow pressurized fluid at the fluid inlet to act on a first side and a second side of at least a portion of the amplifying plate.

Preferably, the sealing ball is sized and shaped to form a substantially fluid-tight seal with the fluid passage.

According to another aspect, a method of forming a valve including a housing with a fluid inlet and a fluid outlet comprises steps of:
positioning one or more vibrating elements in the valve housing;
positioning an amplifying plate including a fluid passage and one or more pressure-balancing apertures in fluid communication with the fluid inlet to contact the one or more vibrating elements; and
positioning a sealing ball between the fluid inlet and the fluid passage formed in the amplifying plate.

Preferably, the method further comprises a step of forming a substantially fluid-tight seal between the amplifying plate and the housing a first sealing member.

Preferably, the method further comprises steps of forming a substantially fluid-tight seal between the housing and the amplifying plate proximate the fluid passage with an inner lip of a second sealing member and forming a substantially fluid-tight seal between the housing and the amplifying plate radially away from the fluid passage with an outer lip of the second sealing member.

Preferably, the method further comprises a step of coupling a sealing ball positioner to the housing to limit radial movement of the sealing ball with respect to the fluid passage.

Preferably, the method further comprises a step of contacting the one or more vibrating elements with an electrical circuit configured to energize the vibrating element.

Preferably, the pressure balancing apertures allow pressurized fluid at the fluid inlet to act on a first side and a second side of at least a portion of the amplifying plate.

Preferably, the sealing ball is sized and shaped to form a substantially fluid-tight seal with the fluid passage.

The present invention will now be described, by way of example only, with reference to the accompanying drawings, in which:

DETAILED DESCRIPTION

FIGS. 2-5 and the following description depict specific examples to teach those skilled in the art how to make and use the best mode of embodiments of a valve. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of the valve. As a result, the embodiments described below are not limited to the specific examples described below, but only by the claims and their equivalents.

Figure 1:
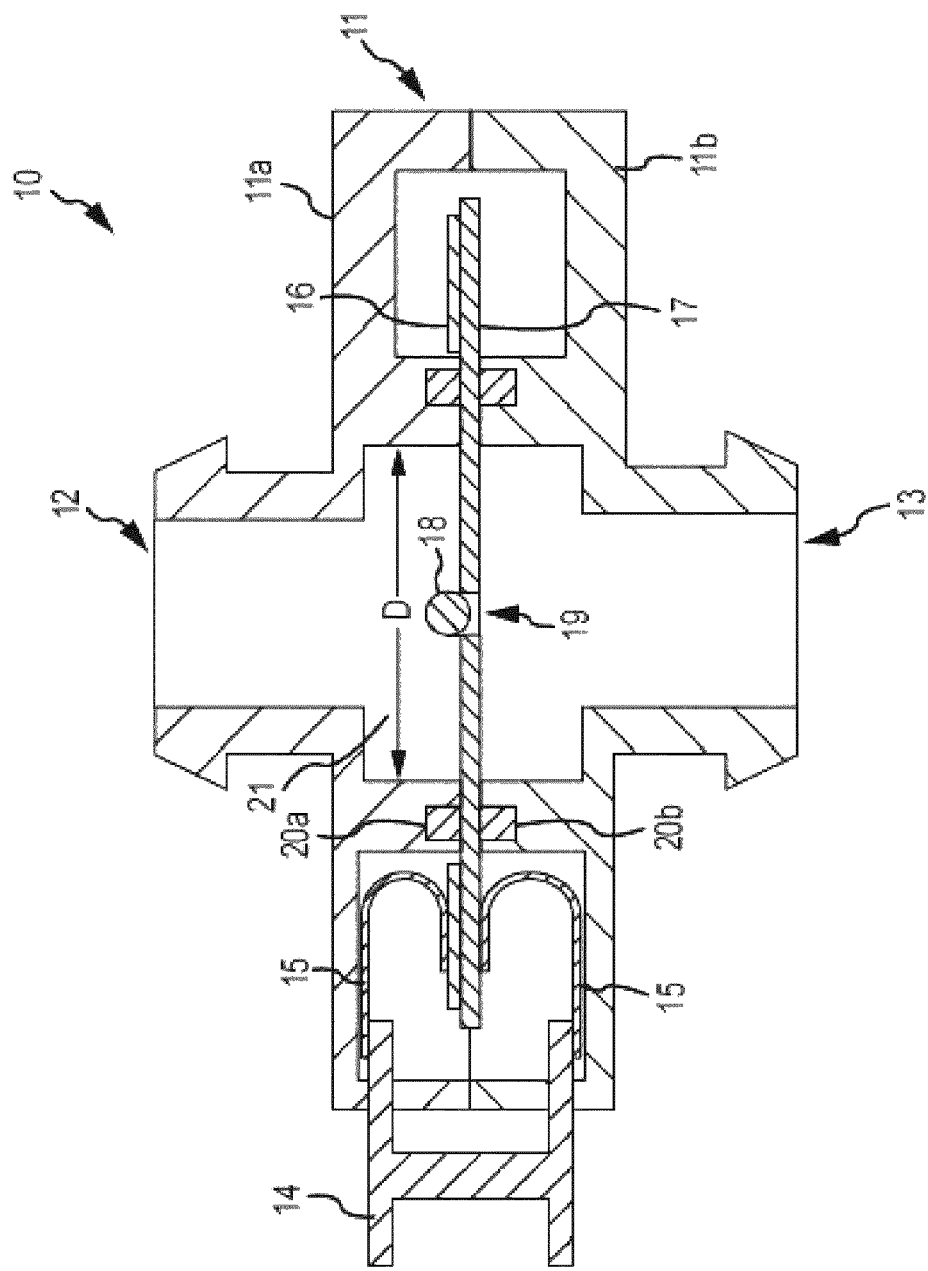
FIG. 1 shows a cross-sectional view of a prior art valve.
Figure 2:
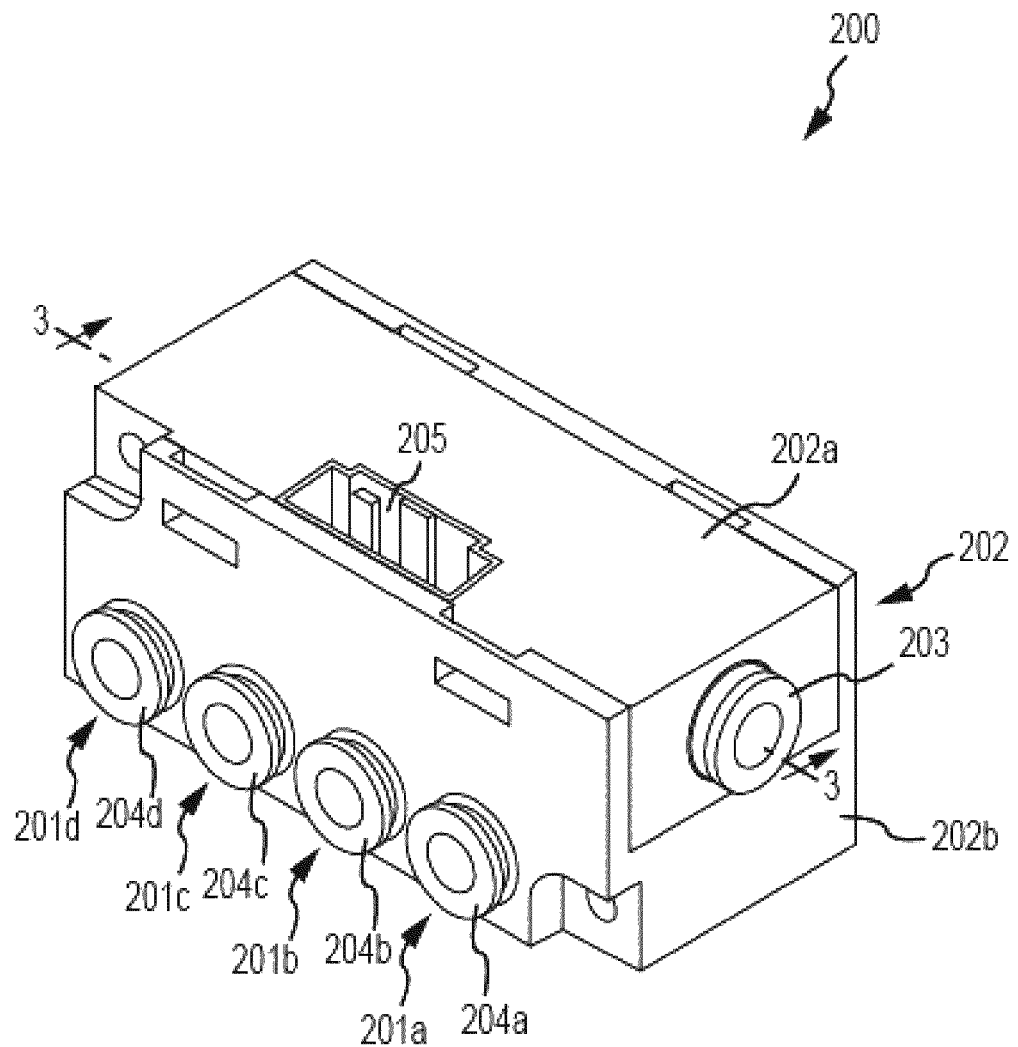
FIG. 2 shows a valve assembly according to an embodiment.

FIG. 2 shows a valve assembly 200 according to an embodiment. The valve assembly 200 shown comprises four individual valves 201a-201d. However, it should be appreciated that the valves 201a-201d may be provided individually without being combined with other valves. For example, the valve assembly 200 may comprise a single valve. Similarly, the valve assembly 200 may include more or less than four valves. Therefore, the particular number of valves 201 forming the valve assembly 200 should in no way limit the scope of the present embodiment.

According to an embodiment, the valve assembly 200 comprises a housing 202, which is shown including a first portion 202a and a second portion 202b. The first portion 202a is configured to couple the second portion 202b according to known methods including, but not limited to, adhesives, welding, brazing, bonding, mechanical fasteners, snap-fit, etc. The particular method used to couple the first 202a and the second portions 202b together should in no way limit the scope of the present embodiment. As can be appreciated, the two portions 202a, 202b can be separated in order to assemble the internal components of the valve assembly 200.

According to an embodiment, the valve assembly 200 further comprises a fluid inlet 203. While a single fluid inlet 203 is shown, the valve assembly 200 may include multiple fluid inlets. For example, each valve 201 of the valve assembly 200 can be provided to control a different type of fluid. In such an embodiment, each fluid could be provided with a separate fluid inlet. The fluid inlet 203 is shown as being formed in the first portion 202a; however, it should be appreciated that the fluid inlet 203 may be alternatively formed in the second portion 202b. The fluid inlet 203 is adapted to couple a pressurized fluid source (not shown). The pressurized fluid may comprise a liquid, a gas, or a combination thereof. The particular type of fluid should in no way limit the scope of the presently described embodiment. The fluid inlet 203 may be coupled directly to the pressurized fluid source or alternatively, be coupled using a fluid delivery apparatus such as a fluid hose or other tubing. The valve assembly 200 is designed to control the flow of the pressurized fluid from the pressurized fluid source by entering the valve assembly 200 through the fluid inlet 203 and exiting the valve assembly 200 through one or more of the fluid outlets 204a-204d. While the fluid inlet 203 and the plurality of fluid outlets 204a-204d are shown extending from the housing 202, it should be understood that in other embodiments, the fluid inlet 203 and/or the fluid outlets 204a-204d can comprise apertures capable of accepting a fluid fitting.

The valve assembly 200 further comprises an electrical connector 205. The electrical connector 205 is provided to electrically connect the valve assembly 200 to an external power source (not shown). The external power source may comprise an electrical outlet, a battery, or some type of computer or controller designed to control the actuation of one or more of the valves 201a-201d. The electrical connector 205 may simply provide electrical communication to the one or more valves 201a-20d or alternatively, the electrical connector 205 may include a processing system of its own configured to determine which of the valves 201a-201d to actuate. For example, the electrical connector 205 may receive an electrical signal based on a known bus protocol, process the electrical signal, and actuate one or more of the valves 201 based on the received signal. In such a situation, the electrical connector 205 may receive a parallel or serial bus signal, for example. Those skilled in the art will readily recognize various other types of connections and signals that are suitable to actuate the valves 201a-201d. The particular configuration used by the electrical connector 205 is not important for purposes of the present embodiment and should in no way limit the scope of the present embodiment.

Figure 3:
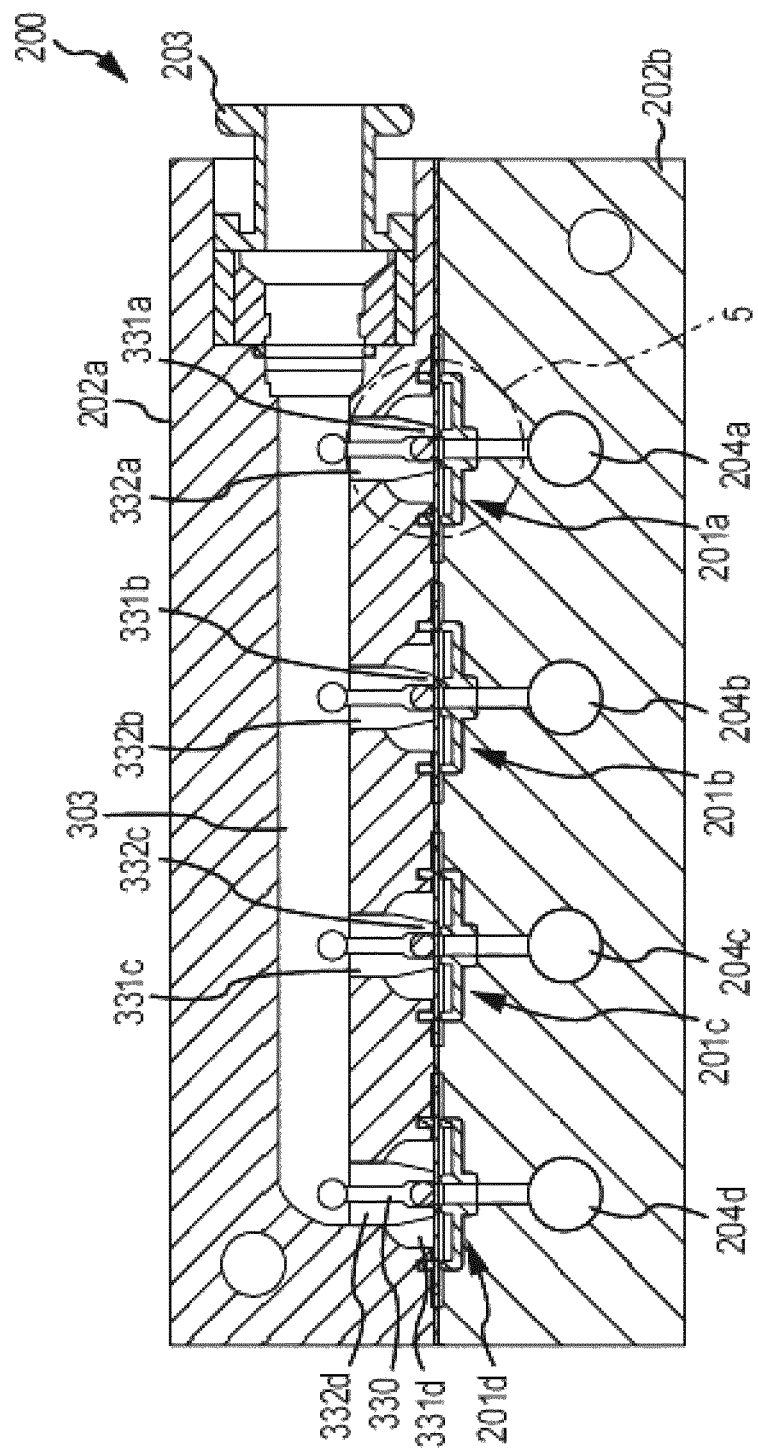
FIG. 3 shows a cross-sectional view of the valve assembly according to an embodiment.

FIG. 3 shows a cross-sectional view of the valve assembly 200 according to an embodiment. The cross-sectional view is taken along line 3-3 of FIG. 2. As shown in FIG. 3, the fluid inlet 203 is in fluid communication with an inlet channel 303 formed in the first portion 202a of the housing 202. While the inlet channel 303 is shown as being formed in the first portion 202a of the housing 202, it should be appreciated that in other embodiments, the inlet channel 303 may be formed in the second portion 202b. The inlet channel 303 provides a fluid communication path between the fluid inlet 203 of the valve assembly 200 and the plurality of valves 201a-201d. More specifically, the inlet channel 303 provides a fluid communication path between the fluid inlet 203 of the valve assembly 200 and each individual valve's fluid inlet 332a-332d. As can be appreciated, in a single valve configuration, the fluid inlet 203 may be the same as the fluid inlet 332 and thus, the fluid inlet 203 could be repositioned to omit the fluid channel 303 if desired. The valve's fluid inlets 332a-332d provide a fluid communication path between the inlet channel 303 and the valve's inlet pressure chamber 331a-331d, which is shown in more detail in FIG. 5 and discussed in the accompanying description.

Figure 4:
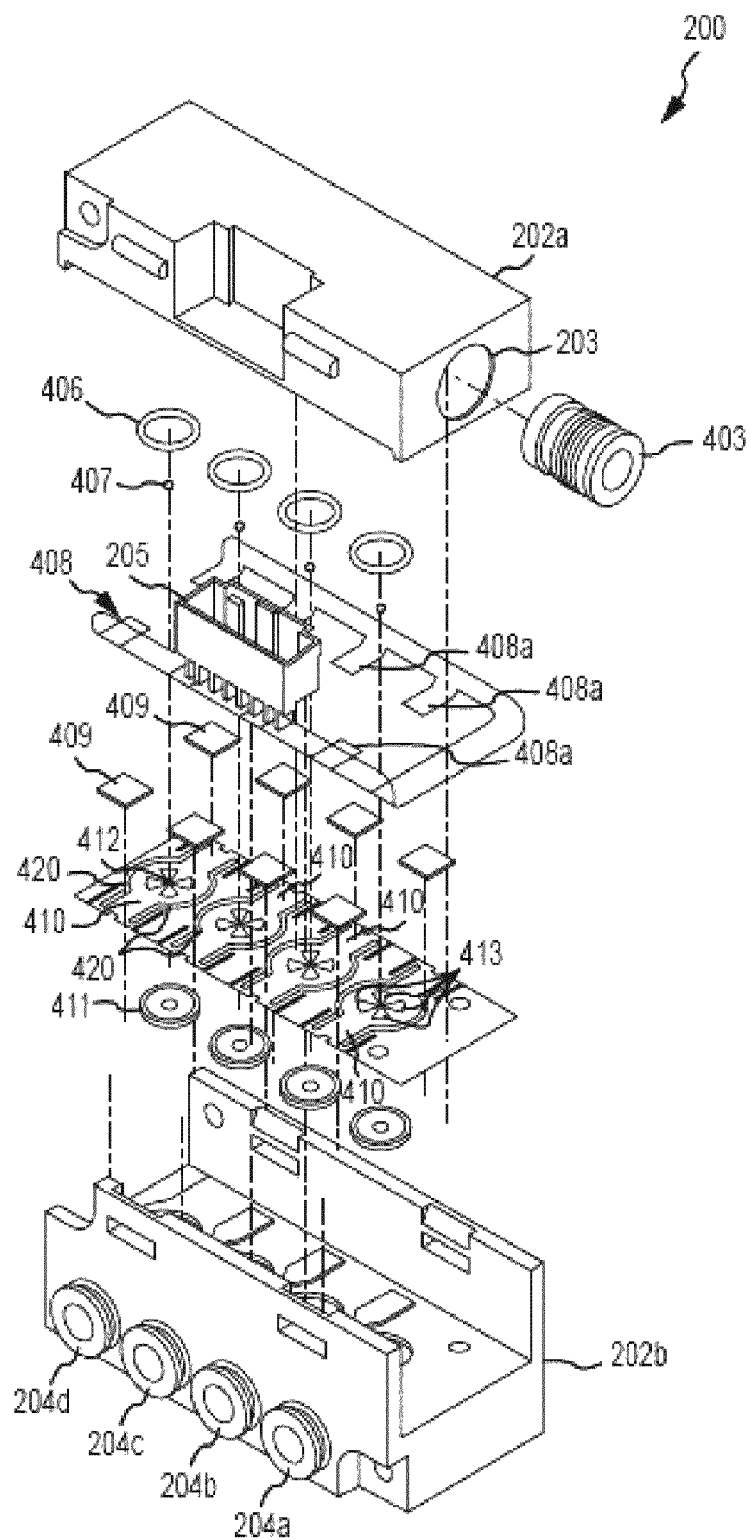
FIG. 4 shows an exploded view of the valve assembly according to an embodiment.

Also shown in FIG. 3, each valve includes a sealing ball positioner 330. The sealing ball positioner 330 may be coupled to the first portion 202a and extend down into the fluid chamber 331. The sealing ball positioner 330 maintains the relative position of a sealing ball 407 (FIG. 4). The sealing ball positioner 330 is discussed in more detail below and is shown in greater detail in FIG. 5.

FIG. 4 shows an exploded view of the valve assembly 200 according to an embodiment. The description that follows references the valve's elements for a single valve 201 and thus, the letter following the number that identifies the particular valve is omitted in many circumstances to simplify the description. It should be appreciated however, that each of the plurality of valves 201a-201d of the valve assembly 200 can have substantially identical components.

According to the embodiment shown, the fluid inlet 203 includes a fluid coupling 403 that is removably coupled to the first portion 202a of the valve assembly 200. In other embodiments, the fluid coupling 403 may comprise an integral portion of the first portion 202a. The fluid coupling 403 may be removable to accommodate various fluid fittings and pressures, for example.

According to an embodiment, each of the plurality of valves 201 can include a first sealing member 406, a sealing ball 407, an electrical circuit 408, one or more vibrating elements 409, an amplifying plate 410 including a fluid passage 412, and a second sealing element 411.

According to an embodiment, the vibrating elements 409 are capable of vibrating when energized, i.e., when exposed to an electric field or an electric potential. According to the embodiment shown in FIG. 4, the vibrating elements 409 comprise square shaped plates. In the embodiment shown, each valve 201 comprises two vibrating elements 409 that are positioned opposite one another with respect to the fluid passage 412. However, it should be appreciated that other shapes are certainly contemplated. For example, in other embodiments, the vibrating elements 409 may comprise disks that substantially surround the fluid passage 412 formed in the amplifying plate 410. Furthermore, the number of vibrating elements 409 associated with each valve 201 can vary.

According to an embodiment, the vibrating elements 409 comprise a piezoelectric material, for example a piezoelectric ceramic. However, other materials are possible, such as electro-active polymers. Piezoelectric ceramics as well as electro-active polymers are well-known in the art and are often used for their physical characteristics when energized by an alternating electric field. If an alternating electric field is applied to the vibrating element 409, the element 409 changes dimensions at the frequency of the electric field. Therefore, the vibrating elements 409 can advantageously convert electrical energy into mechanical energy. As can be appreciated, if the electric field is applied at a combined resonance frequency of the one or more vibrating elements 409 and the corresponding amplifying plate 410, the system will vibrate most efficiently.

In some embodiments, the vibrating element 409 can be capable of vibrating when energized with a relatively low voltage. For example, in one embodiment, the vibrating element 409 may be powered using a low DC voltage, for example about 24 volts. Those skilled in the art will readily recognize that if a DC voltage is implemented, additional electronics may be required to generate an alternating signal. Therefore, this is merely one example and other configurations and voltages are contemplated and within the scope of the present embodiment.

According to an embodiment, the vibrating element 409 is energized by the electrical circuit 408, which is in electrical communication with the electrical connector 205. The electrical circuit 408 may comprise an electronic ribbon, a plurality of electrical wires or traces, a printed circuit board, or the like, for example. The particular configuration of the electrical circuit 408 is not important. However, the electrical circuit 408 should be capable of communicating an electrical signal between the electrical connector 205 and one or more of the vibrating elements 409.

According to the embodiment shown, the electrical circuit 408 includes one or more tabs 408a corresponding to each of the vibrating elements 409. The tabs 408a can be coupled to the vibrating elements 409. For example, the tabs 408a could be coupled to the vibrating elements 409 by soldering, conductive paste, conductive adhesive, etc. Alternatively, the tabs 408a may simply contact the vibrating elements 409. According to an embodiment, the tabs 408a may provide one or more electrical contact points for each of the vibrating elements 409. The tabs 408a may enable each vibrating element 409 to be energized individually by providing at least two electrical contacts. For example, one electrical contact may be provided with a power supply while the other electrical contact is maintained at a reference voltage, for example ground. In the present embodiment that includes two vibrating elements 409 for each valve 401, this may enable one vibrating element 409 to be energized for low flow applications and both vibrating elements 409 to be energized for higher flow applications that require increased vibrations. In addition, by controlling the signal (frequency and/or amplitude) in either situation a proportional fluid control can be obtained.

Alternatively, the amplifying plate 410 may comprise an electrically conductive material or an electrically conductive path that allows the electrical energy to travel from one tab 408a through one of the vibrating elements 409 for a valve 401 and then through the amplifying plate 410 prior to reaching the corresponding vibrating element 409 and tab 408a on the opposite side of the valve 401 to close the electrical circuit. In other words, the amplifying plate 410 can comprise the common ground. According to this embodiment, the electrical circuit 408 may be further coupled to the amplifying plate 410. The electrical circuit 408 may be coupled to the amplifying plate 410 using known methods such as welding, soldering, conductive adhesives, etc. With the electrical circuit 408 coupled to the amplifying plate 410, the amplifying plate 410 should be at least partially formed from an electrically conductive material. According to an embodiment, one example of an electrically conductive material that may be suitable for the valve 401 is stainless steel. Stainless steel is both electrically conductive and relatively corrosion resistant for a wide variety of fluids. However, other conductive materials may be used for the amplifying plate 410 depending on the anticipated fluid. It should be appreciated that the above-mentioned configurations are merely examples of possible ways to electrically couple the various components of the valve 201 to energize the vibrating elements 409. Those skilled in the art will readily recognize alternative configurations that fall within the scope of the present embodiment.

According to an embodiment, the electrical circuit 408 is configured to energize the one or more vibrating elements 409 associated with one or more of the valves 201 based on an electrical signal received from the electrical connector 205. In other words, the electrical circuit 408 may energize one or more of the vibrating elements 409 corresponding to a single valve 201 or more than one valve 201 at a time.

According to an embodiment, the vibrating elements 409 are coupled to the amplifying plate 410. The amplifying plate 410 can be provided to amplify the vibrations created by the vibrating elements 409. The amount of amplification may vary based on the distance (diameter) the amplifying plate 410 extends between the vibrating elements 409, for example.

Those with a basic understanding of plate mechanics can easily recognize that the vibrations produced at the radial ends of the amplifying plate 410 are amplified the greatest at the center of the amplifying plate 410 where the fluid passage 412 is located. Therefore, depending on the particular vibrational mode energized, the amplification at the center generally increases as a function of the distance (diameter) between the vibrating elements 409 or alternatively, in the present embodiment, as a function of the distance (diameter) between the sealing members 406, 411. This can be advantageous in some embodiments because the vibrations produced by the vibrating elements 409 can be minimized while maintaining adequate vibrational amplitude applied to the sealing ball 407, which is located at approximately the radial center of the amplifying plate 410. In other embodiments, the amplifying plate 410 may not be provided to amplify the vibrations produced by the vibrating elements 409, but rather may simply transfer the vibrations from the vibrating element 409 to the sealing ball 407.

In some circumstances, the fluid being delivered may adversely affect the life and/or performance of the vibrating elements 409. For example, the fluid may corrode the vibrating elements 409. Therefore, the amplifying plate 410, which as explained above, may be formed from stainless steel, can provide separation between the fluid and the vibrating element 409. In order to ensure the vibrating elements 409 are not exposed to the fluid, the sealing members 406, 411 may be provided to seal off the fluid and prevent exposure to the vibrating elements 409. While the sealing members 406, 411 may provide proper fluid separation, in order to efficiently transmit the vibrations from the vibrating elements 409 to the sealing ball 407, the sealing members 406, 411 should be preferably made of a soft elastomer and placed in an area where there is little or no axial displacement (area called nodal points) or at least where the displacement of the amplifying plate 410 is minimal. In one example embodiment, the sealing members comprise rubber. The first sealing member 406 may comprise a rubber O-ring, for example. However, in some embodiments, the second sealing member 411 can provide a dual sealing function as explained in more detail below.

According to the embodiment shown, the various amplifying plates 410 of each of the valves 401a-401d are shown coupled together to form a single sheet. It should be appreciated that the amplifying plates 410 do not need to comprise a single sheet and the present example should in no way limit the scope of the present embodiment. However, in embodiments where the valve assembly 200 comprises multiple valves, forming the amplifying plates 410 as a single sheet may provide easier and cheaper manufacturing. As shown, the sheet can include cut-out portions, such as cut out portions 420, that can provide suitable vibration separation between the various amplifying plates 410 such that vibration of one amplifying plate 410 does not adversely affect vibrations of a neighboring amplifying plate 410.

According to an embodiment, the amplifying plates 410 comprise a fluid passage 412. The fluid passage 412 provides a fluid communication path between the fluid inlet 332 and the fluid outlet 204. In order to control the flow of fluid through the fluid passage 412, the sealing ball 407 is sized and shaped to form a substantially fluid-tight seal with the fluid passage 412. Consequently, when the vibrating elements 409 are de-energized, the pressure of the fluid acts on the sealing ball 407 to force the sealing ball 407 against the fluid passage 412, thereby forming a substantially fluid-tight seal. Although not shown, in some embodiments, the fluid passage 412 may be provided with an additional sealing member, such as a rubber or plastic seal to aid in forming a substantially fluid-tight seal with the sealing ball 407.

In addition to the fluid passage 412, the amplifying plates 410 include one or more pressure-balancing apertures 413. In the embodiment shown, the amplifying plates 410 comprise four pressure-balancing apertures 413. However, it should be appreciated that the amplifying plates 410 may include any number of desired pressure-balancing apertures 413. The pressure-balancing apertures 413 are described in more detail below.

Figure 5:
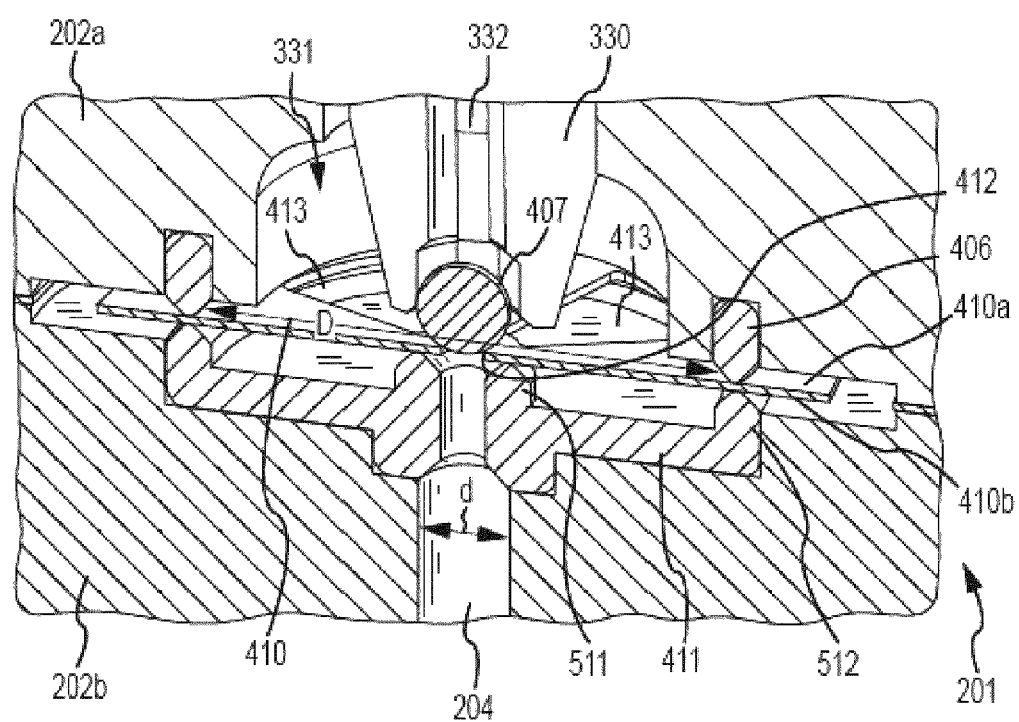
FIG. 5 shows an enlarged cross-sectional view of a portion of a valve according to an embodiment.

FIG. 5 shows an enlarged cross-sectional view of a portion of an assembled valve 201. FIG. 5 is taken from the circle 5 shown in FIG. 3. FIG. 5 shows the valve 201 with the first and second portions 202a, 202b coupled to one other. As shown in FIG. 5, the first sealing member 406 forms a substantially fluid-tight seal between the first portion 202a of the housing 202 and the amplifying plate 410. More specifically, the first sealing member 406 forms a substantially fluid-tight seal between the first portion 202a of the housing 202 and a first side 410a of the amplifying plate 410. In the prior art valve disclosed in the '233 application, the first sealing member 406 along with the amplifying plate 410 would essentially define the inlet pressure chamber 331 resulting in the pressurized fluid at the inlet 332 acting across substantially the entire diameter, D (neglecting the area of the fluid passage 412). However, as shown in FIG. 5, the plurality of pressure-balancing apertures 413 extends the fluid chamber 331 below at least a portion of the amplifying plate 410.

Consequently, according to an embodiment, the second sealing member 411 comprises an inner sealing lip 511 and an outer sealing lip 512. Furthermore, the second sealing member 411 extends between the inner and outer sealing lips to help define the fluid chamber 331. It should be appreciated that in alternative embodiments, the inner sealing lip 511 and the outer sealing lip 512 may be formed from different sealing members. For example, the inner and outer sealing lips could comprise individual O-ring seals. Therefore, the second portion 202b of the housing 202 could define the lower side of the fluid chamber 331 rather than the sealing member 411.

According to an embodiment, the outer sealing lip 512 forms a substantially fluid-tight seal between the amplifying plate 410 and the second portion 202b of the housing 202 to prevent fluid from reaching the vibrating elements 409, for example. More specifically, the outer sealing lip 512 forms a substantially fluid-tight seal between a second side 410b of the amplifying plate 410 and the second portion 202b. The outer sealing lip 512 forms the substantially fluid-tight seal radially away from the fluid passage 412. In the embodiment shown, the outer sealing lip 512 forms the seal at a distance of approximately D/2 away from the fluid passage 412. According to an embodiment, the inner sealing lip 511 forms a substantially fluid-tight seal with the amplifying plate 410 proximate the fluid passage 412. More specifically, the inner sealing lip 511 forms a substantially fluid-tight seal with the second side 410b of the amplifying plate 410 proximate the fluid passage 412. According to an embodiment, the inner sealing lip 511 forms the seal at approximately d/2. The inner sealing lip 511 can therefore prevent fluid in the fluid chamber 331 from bypassing the sealing ball 407. As result of the pressure-balancing apertures 413, the pressurized fluid in the fluid chamber 331 is exposed to both the first side 410a and the second side 410b of the amplifying plate 410 for at least a portion of the amplifying plate 410. This exposure results in the pressurized fluid in the chamber 331 being substantially balanced with respect to the amplifying plate 410 except for the distance between the fluid passage 412 and the inner boundary of the pressure-balancing apertures 413 resulting in an area defined by diameter, d, that the pressurized fluid acts on to dampen the vibrational amplitude. As can be appreciated, the diameter, d, of the present embodiment the pressurized fluid acts upon is much smaller than the diameter, D, of the prior art valve. The pressure acting on the first side 410a of the amplifying plate 410 and the pressure acting on the second side 410b between the sealing lips 511, 512 is substantially equal. Therefore, the vibrational damping due to pressurized fluid is substantially reduced for the present embodiment compared to the prior art valve.

According to an embodiment, the sealing ball 407 is positioned between the fluid inlet 332 and the fluid passage 412 formed in the amplifying plate 410. As shown in FIG. 5, the sealing ball 407 is maintained proximate the fluid passage 412 by the sealing ball positioner 330. In the prior art valve disclosed in the '233 application, a sealing ball positioner 330 was not required because the fluid pressure forced the sealing ball into the fluid passage, which was the only aperture in the amplifying plate. However, in the present embodiment, there is a chance that the fluid pressure could force the sealing ball 407 against one of the pressure-balancing apertures 413 rather than the fluid passage 412. This could result in a valve 401 being left open well beyond the time the vibrations of the vibrating element 409 stop. Therefore, the sealing ball positioner 330 substantially surrounds the sealing ball 407 to restrict movement of the sealing ball 407 generally parallel to the fluid passage 412. In addition, the sealing ball positioner 330 can prevent the sealing ball 407 from moving away from the fluid passage 412 during transportation, mounting, disassembling, etc. As shown, the sealing ball positioner 330 allows the sealing ball 407 to rise above and away from the amplifying plate 410. However, the sealing ball positioner 330 can maintain the sealing ball's position proximate the fluid passage 412 such that when the vibrations of the vibrating elements 409 and thus, the amplifying plate 410 stop, the fluid pressure will force the sealing ball 407 against the fluid passage 412.

In use when fluid is desired at a valve outlet 204 for a specific valve 201, one or more vibrating elements 409 for the valve 201 can be energized. When the vibrating element 409 is energized, the vibrating element 409 begins to vibrate. According to an embodiment, the vibrating elements 409 are energized at the resonant frequency of the system. This resonant frequency may be based on the resonant frequency of the vibrating element 409 and the amplifying plate 410, or alternatively, it may be based on the valve 401 as a whole. Preferably, the resonant frequency is not based on the resonant frequency of the valve assembly 200 so as to prevent vibrations in the other amplifying plates 410. According to an embodiment, the valve 201 may include a feedback for a parameter setup. For example, the parameter setup can adjust the frequency, the fluid flow rate, etc. Additionally, the parameter setup can configure the valve 201 to regulate the parameters set by the user of the valve 201.

The vibrations produced by the one or more vibrating elements 409 are transferred and preferably amplified by the amplifying plate 410. Because the amplifying plate 410 vibrates, any fluid that has dried on the amplifying plate 410 around the fluid passage 412 is likely to be broken off from the amplifying plate 410. This advantageously prevents the fluid passage 412 from clogging during periods of non-use. The vibrations provided to the amplifying plate 410 only need to overcome the force of the pressurized fluid acting on the sealing ball 407 to cause the seal between the sealing ball 407 and the fluid passage 412 to break, thus allowing fluid to exit through the fluid outlet 204. The frequency and/or amplitude of the vibrations can be controlled in order to control energy supplied to the sealing ball 407, which in turn controls the flow of fluid through the valve 201. As can be appreciated, as the amplifying plate 410 is vibrating, the pressurized fluid is acting on both sides of the amplifying plate 410 for at least a portion of the amplifying plate 410. Specifically, in the embodiment shown, the fluid is acting on both sides of the amplifying plate 410 for the area defined by D minus the area defined by d. Advantageously, the amplitude damping caused by the pressure of the fluid on the amplifying plate 410 is substantially reduced.

Substantially instantaneously upon removing the energy supplied to the vibrating element 409, the vibrations cease and the pressurized fluid again forces the sealing ball 407 to seal against the fluid passage 412 to stop the fluid flow. Because the movement of the sealing ball 407 radially away from the fluid passage 412 during periods of vibrations is substantially limited by the sealing ball positioner 330, the risk of the sealing ball 407 sealing against one of the pressure-balancing apertures 413 rather than the fluid passage 412 is substantially reduced. In addition to the sealing ball 407 being forced against the fluid passage 412, the fluid pressure also forces the amplifying plate 410 against the inner sealing lip 511 to further prevent fluid from leaking into the fluid outlet 204 between the amplifying plate 410 and the inner sealing lip 511.

As shown, the valve 201 optimally limits the fluid exposure to the fluid inlet 332, the pressure chamber 331, and the fluid outlet 204. Therefore, the only internal components exposed to the fluid are the sealing ball 407, the sealing elements 406, 411, and the amplifying plate 410. The sealing elements 406, 411 advantageously prevent fluid from reaching the vibrating elements 409. This not only increases the life of the vibrating elements 409, but also reduces the chance of electrical shorts caused by the fluid reaching the electrical circuit 408.

The valve 201 provides an effective and efficient method for controlling fluid delivery, especially for situations where the fluid pressure would prevent use of the valve disclosed in the '233 application. The valve 201 is able to prevent fluid flow in the absence of power by using only the fluid pressure to seal the sealing ball 407 against the fluid passage 412. Unlike some prior art valves, the valve 201 does not require an independent biasing device to force the sealing ball 407 against the fluid passage 412.

Additionally, when fluid is delivered through the valve 201, the valve 201 minimizes power consumption by amplifying the vibrations using the amplifying plate 207. Power consumption is further reduced by the pressure-balancing apertures 413 to reduce the fluid damping exerted on the amplifying plate 410. The valve 201 thus provides a compact, low voltage fluid delivery apparatus with a minimum number of parts.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments of, and examples for, the valves are described herein for illustrative purposes, various equivalent modifications are possible within the scope of the present description, as those skilled in the relevant art will recognize. The teachings provided herein can be applied to other valves, and not just to the embodiments described above and shown in the accompanying figures. Accordingly, the scope of the embodiments should be determined from the following claims.

I claim:

1. An apparatus, comprising:
a housing (202) including a fluid inlet (332) and a fluid outlet (204);
one or more vibrating elements (409) configured to vibrate when energized;
an amplifying plate (410) including a fluid passage (412) and one or more pressure-balancing apertures (413) in fluid communication with the fluid inlet (332), contacting the one or more vibrating elements (409);
a sealing ball (407) positioned between the fluid inlet (332) and the fluid passage (412);
a first sealing member (406) forming a substantially fluid-tight seal between the amplifying plate (410) and the housing (202); and
a second sealing member (411) including an inner sealing lip (511) forming a substantially fluid-tight seal between the housing (202) and the amplifying plate (410) proximate the fluid passage (412) and an outer sealing lip (512) forming a substantially fluid-tight seal between the housing (202) and the amplifying plate (410) radially away from the fluid passage (412).

2. The apparatus of claim 1, further comprising a sealing ball positioner (330) coupled to the housing (202) and limiting radial movement of the sealing ball (407) with respect to the fluid passage (412).

3. The apparatus of claim 1, further comprising an electrical circuit (408) contacting the vibrating element (409) and configured to energize the vibrating element (409).

4. The apparatus of claim 1, wherein the pressure balancing apertures (413) allow pressurized fluid at the fluid inlet (332) to act on a first side (410a) and a second side (410b) of at least a portion of the amplifying plate (410).

5. The apparatus of claim 1, wherein the sealing ball (407) is sized and shaped to form a substantially fluid-tight seal with the fluid passage (412).

6. A method of forming a valve including a housing with a fluid inlet and a fluid outlet, comprising steps of:
positioning one or more vibrating elements in the valve housing;
positioning an amplifying plate including a fluid passage and one or more pressure-balancing apertures in fluid communication with the fluid inlet to contact the one or more vibrating elements;
positioning a sealing ball between the fluid inlet and the fluid passage formed in the amplifying plate;
forming a substantially fluid-tight seal between the amplifying plate and the housing using a first sealing member;
forming a substantially fluid-tight seal between the housing and the amplifying plate proximate the fluid passage with an inner lip of a second sealing member and forming a substantially fluid-tight seal between the housing and the amplifying plate radially away from the fluid passage with an outer lip of the second sealing member.

7. The method of claim 6, further comprising a step of coupling a sealing ball positioner to the housing to limit radial movement of the sealing ball with respect to the fluid passage.

8. The method of claim 6, further comprising a step of contacting the one or more vibrating elements with an electrical circuit configured to energize the vibrating element.

9. The method of claim 6, wherein the pressure balancing apertures allow pressurized fluid at the fluid inlet to act on a first side and a second side of at least a portion of the amplifying plate.

10. The method of claim 6, wherein the sealing ball is sized and shaped to form a substantially fluid-tight seal with the fluid passage.

* * * * *